(12) United States Patent
Ting et al.

(10) Patent No.: US 10,275,034 B1
(45) Date of Patent: Apr. 30, 2019

(54) ELECTRONIC DEVICE HAVING SOUND-PRODUCING VIBRATOR

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Shih-Fang Ting, New Taipei (TW); Zhi-Bin Guo, Shenzhen (CN); Shu-Jiang Han, Shenzhen (CN); Biao Hu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/859,769

(22) Filed: Jan. 2, 2018

(30) Foreign Application Priority Data

Dec. 26, 2017 (CN) .......................... 2017 1 1433006

(51) Int. Cl.
| | |
|---|---|
| *G08B 7/06* | (2006.01) |
| *G10K 9/12* | (2006.01) |
| *A61F 9/08* | (2006.01) |
| *G06F 3/041* | (2006.01) |
| *G06F 3/01* | (2006.01) |

(52) U.S. Cl.
CPC ............... *G06F 3/016* (2013.01); *G08B 7/06* (2013.01); *G10K 9/12* (2013.01)

(58) Field of Classification Search
CPC ....................................................... G06F 3/016
See application file for complete search history.

(56) References Cited

U.S. PATENT DOCUMENTS

| | | | |
|---|---|---|---|
| 9,547,366 B2* | 1/2017 | Ullrich ................ | G06F 15/0291 |
| 9,740,288 B2* | 8/2017 | Hiraoka .................. | G06F 3/016 |
| 9,753,536 B2* | 9/2017 | Arai ......................... | G06F 3/016 |
| 2002/0149561 A1* | 10/2002 | Fukumoto .......... | G01C 21/3664 |
| | | | 345/156 |
| 2007/0137096 A1* | 6/2007 | Ragon .................... | A01M 1/02 |
| | | | 43/132.1 |
| 2017/0214132 A1* | 7/2017 | Jeon ................... | G06Q 20/3278 |

* cited by examiner

*Primary Examiner* — Joseph H Feild
*Assistant Examiner* — Pameshanand Mahase
(74) *Attorney, Agent, or Firm* — ScienBizip, P.C.

(57) ABSTRACT

An electronic device with a vibrating element which also produces sound includes a casing, an operation panel mounted to the casing, and a vibrator and a processor received in the casing. The operation panel includes a plurality of buttons. Each button can generate an input signal when pressed. The vibrator is attached to an inner surface of the casing. The processor is electrically connected to each button and the vibrator. The processor controls the vibrator to vibrate at a preset frequency in response to the input signal, thereby simultaneously generating sound with the vibration. The size of the electronic device is accordingly decreased.

10 Claims, 2 Drawing Sheets

ELECTRONIC DEVICE HAVING SOUND-PRODUCING VIBRATOR

FIELD

The subject matter relates to electronic devices, and more particularly, to an electronic device having a vibrator.

BACKGROUND

Many portable electronic devices, such as remote controllers, are becoming thinner and lighter in weight. A remote controller includes a number of buttons. When each button is pressed, the remote controller generates vibration and sound, thereby providing feedback to the user. The vibration is usually generated by a vibrator. The sound is usually generated by a buzzer. That is, the remote controller must both have the vibrator and the buzzer to generate vibration and sound, respectively.

However, the vibrator and the buzzer may increase the total size of the remote controller. Improvements in the art are preferred.

BRIEF DESCRIPTION OF THE DRAWINGS

Implementations of the present disclosure will now be described, by way of example only, with reference to the attached figures.

DETAILED DESCRIPTION

Figure 1:
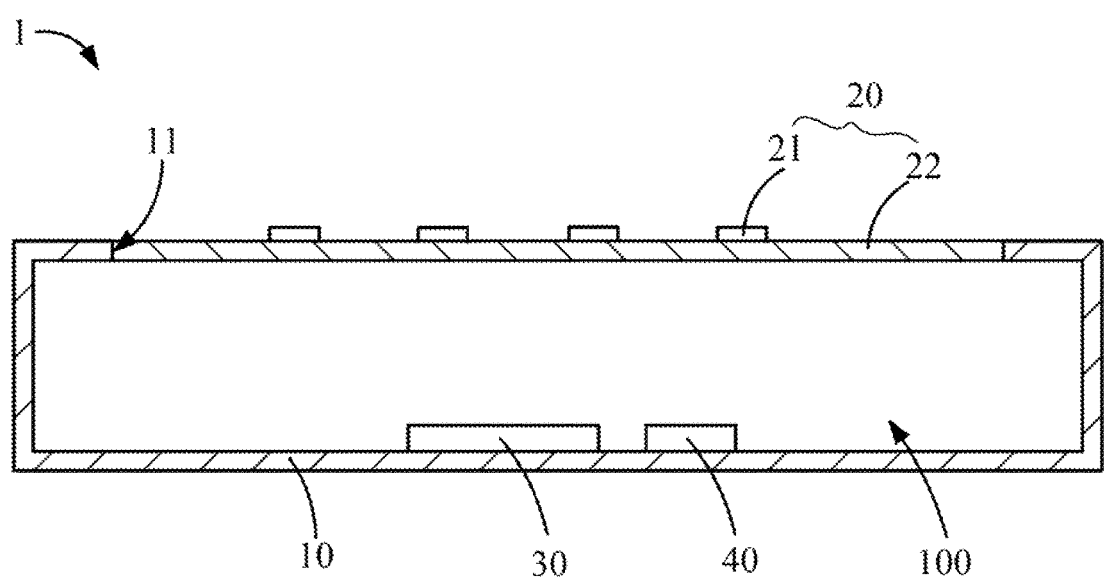
FIG. 1 is a diagram of an exemplary embodiment of an electronic device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder.

The term "comprising," when utilized, means "including, but not necessarily limited to"; it specifically indicates open-ended inclusion or membership in the so-described combination, group, series, and the like.

FIG. 1 illustrates an exemplary embodiment of an electronic device 1. The electronic device 1 can be, but is not limited to, a remote controller, a smart phone, a multimedia player, and a tablet computer. The electronic device 1 comprises a casing 10, an operation panel 20 mounted to the casing 10, and a vibrator 30 and a processor 40 received in the casing 10.

In at least one exemplary embodiment, the casing 10 is substantially rectangular, and defines a receiving space 100. The vibrator 30 and the processor 40 are received in the receiving space 100.

The casing 10 defines an opening 11 at a front surface thereof. The operation panel 20 is fixedly received in the opening 11. The operation panel 20 comprises a panel body 22 and a number of buttons 21 mounted on the panel body 20. The buttons 21 can be mechanical buttons or virtual buttons. When the buttons 21 are mechanical buttons, the panel body 22 and the casing 10 are integrally formed. When the buttons 21 are virtual buttons, the panel body 22 and the casing 10 are separately formed. The operation panel 20 is a touch sensitive panel.

Figure 2:
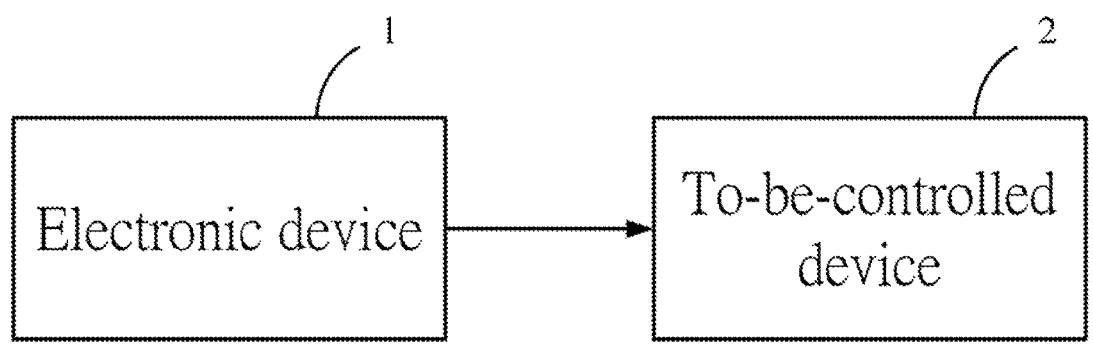
FIG. 2 is a diagram of an environment of the electronic device of FIG. 2.

Each button 21 generates an input signal when the button 21 is pressed. The processor 40 is electrically connected to each button 21. The processor 40 can be a central processing unit (CPU), a microprocessor, or other data processor chip. Referring to FIG. 2, the processor 40 controls a to-be-controlled device 2 (for example, a television or an air conditioner) or the electronic device 1 itself to perform actions in response to the input signal.

In at least one exemplary embodiment, when the electronic device 1 is the remote controller, the processor 40 generates a remote command according to an encoding mode corresponding to the input signal. The remote command can be in a form of BLUETOOTH, infrared, or radio frequency (RF). The processor 40 further transmits the remote command to the to-be-controlled device 2 through an infrared LED or an antenna (not shown). Each encoding mode corresponds to an action of the to-be-controlled device 2, for example, powering on or powering off. When the to-be-controlled device 2 receives the remote command, the to-be-controlled device 2 decodes the remote command and performs the corresponding actions.

In another exemplary embodiment, when the electronic device 1 is the smart phone, the tablet computer, or the multimedia player, the processor 40 controls the electronic device 1 itself to perform the corresponding actions in response to the input signal.

The vibrator 30 is attached to an inner surface of the casing 10. In at least one exemplary embodiment, the vibrator 30 is a linear motor (that is, an impulse motor).

The processor 40 is further electrically connected to the vibrator 30. The processor 40 further controls the vibrator 30 to vibrate at a preset frequency in response to the input signal. Since the vibrator 30 is attached to the inner surface of the casing 10, the vibration from the vibrator 30 is delivered to the user through the casing 10, thereby providing vibration feedback to the user. Moreover, the vibrator 30 can also generate sound when vibrating at the preset frequency, thereby simultaneously providing sound feedback to the user.

In at least one exemplary embodiment, the preset frequency is about 420 Hz. The vibrator 30 can generate the sound of "beep" when vibrating at about 420 Hz.

With the above configuration, the vibrator 30 functions as a vibration generating device, and also as a sound generating device. Thus, utilization ratio of the vibrator 30 is improved, and manufacturing cost is reduced. Furthermore, since no buzzer is needed, the size of the electronic device 1 can be decreased.

Even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. An electronic device comprising:
   a casing;
   an operation panel mounted to the casing, the operation panel comprising a plurality of buttons, each of the plurality of buttons configured to generate an input signal when being pressed;
   a vibrator received in the casing and attached to an inner surface of the casing; and
   a processor received in the casing, the processor electrically connected to each of the plurality of buttons and the vibrator, the processor configured to:
      control the vibrator to vibrate at a preset frequency in response to the input signal, thereby causing the vibrator to generate vibration which is delivered through the casing; and
      cause the vibrator itself to simultaneously generate sound when vibrating at the preset frequency;
   wherein the vibrator is a linear motor, and when the preset frequency is 420 Hz, the vibrator generates the sound of "beep".

2. The electronic device of claim 1, wherein the electronic device is a remote controller, and the processor is further configured to control a to-be-controlled device to perform corresponding an action corresponding to the input signal.

3. The electronic device of claim 2, wherein the processor is further configured to generate a remote control command according to an encoding mode corresponding to the input signal, and transmit the remote control command to the to-be-controlled device, thereby controlling the to-be-controlled device to perform an action corresponding to the input signal.

4. The electronic device of claim 1, wherein the remote control command is transmitted in a modulated signal employing BLUETOOTH™, infrared, and radio frequency.

5. The electronic device of claim 1, wherein the processor is further configured to control the electronic device itself to perform an action corresponding to the input signal.

6. The electronic device of claim 1, wherein the casing is substantially rectangular and defines a receiving space, and the vibrator and the processor are received in the receiving space.

7. The electronic device of claim 1, wherein the casing comprises a front surface defining an opening, and the operation panel is fixedly received in the opening.

8. The electronic device of claim 7, wherein the operation panel further comprises a panel body integrally formed with the casing, the plurality of buttons are mounted on the panel body.

9. The electronic device of claim 1, wherein the buttons are mechanical buttons or virtual buttons.

10. An electronic device comprising:
    a casing;
    a plurality of buttons mounted to the casing, each of the plurality of buttons configured to generate an input signal when being pressed;
    a vibrator received in the casing and attached to an inner surface of the casing; and
    a processor received in the casing, the processor electrically connected to each of the plurality of buttons and the vibrator, the processor configured to:
       control the vibrator to vibrate at a preset frequency in response to the input signal, thereby causing the vibrator to generate vibration which is delivered through the casing; and
       cause the vibrator itself to simultaneously generate sound when vibrating at the preset frequency;
    wherein the vibrator is a linear motor, and when the preset frequency is 420 Hz, the vibrator generates the sound of "beep".

\* \* \* \* \*